United States Patent [19]
Sluyterman

[11] Patent Number: 4,866,336
[45] Date of Patent: Sep. 12, 1989

[54] DISPLAY DEVICE INCLUDING A COMBINATION OF A DISPLAY TUBE AND A DEFLECTION UNIT

[75] Inventor: Albertus A. S. Sluyterman, Eindhoven, Netherlands

[73] Assignee: U.S. Philips Corp., New York, N.Y.

[21] Appl. No.: 168,192

[22] Filed: Mar. 15, 1988

[30] Foreign Application Priority Data

Apr. 9, 1987 [NL] Netherlands ........................ 8700835

[51] Int. Cl.[4] ........................ H01J 29/76; H04N 9/28
[52] U.S. Cl. .................................... 313/431; 313/440; 335/213
[58] Field of Search ........................ 313/440, 431, 430; 335/210, 213

[56] References Cited

U.S. PATENT DOCUMENTS 4,755,714 7/1988 Sluyterman ........................ 313/440

FOREIGN PATENT DOCUMENTS 173940 3/1986 European Pat. Off. ............ 313/440

*Primary Examiner*—Kenneth Wieder

[57] ABSTRACT

By providing a deflection unit with deflection fields which are considerably shifted with respect to each other and by providing it with the correct sixpole components it is possible to realize a system with a minimum deflection defocusing. The vertical deflection field extends further to the gun than the horizontal deflection field and it has a negative gun sided 6-pole component and a positive screen-sided 6-pole component. The 6-pole components of the horizontal deflection field have a reversed sign.

3 Claims, 3 Drawing Sheets

DISPLAY DEVICE INCLUDING A COMBINATION OF A DISPLAY TUBE AND A DEFLECTION UNIT

BACKGROUND OF THE INVENTION

The invention relates to a display device including a display tube whose neck accommodates an electron gun system for emitting at least one electron beam toward a facing display screen, and an electromagnetic deflection unit arranged around the envelope of the display tube. A first deflection coil and a second deflection coil arranged coaxially with respect to the first deflection coil each have a front end facing the display screen and a rear end, the deflection fields generated by the two deflection coils upon energization being at right angles to each other and both extending in a part of the space between the gun system and the display screen.

In monochrome display tubes the electron gun system is adapted to produce one electron beam. In colour display tubes the electron gun system is adapted to produce three electron beams.

In monochrome display tubes for, for example data display uses and for t.v. projection tubes the aim is to use a deflection unit with deflection coils which give such a field distribution that the spot quality is as perfect as possible both in the centre of the display screen and in its corners.

For some time colour display tubes have been used in which three spatially separated electron guns are located in one line. Such a display tube is known as an in-line colour display tube. In the in-line colour display tube the aim is to use a deflection unit with deflection coils giving such an inhomogeneous field distribution that the beams of the electron guns coincide across the entire screen when they are deflected. To this end particularly the horizontal deflection field (to be generated by the second deflection coil) must be barrel-shaped on the gun side of the deflection yoke and pincushion-shaped towards the screen side and, conversely, the vertical deflection field (to be generated by the first deflection coil) must be pincushion-shaped on the gun side and barrel-shaped towards the screen side.

The extent of pincushion and barrel shape is such that in the case of deflection the convergence errors of the electron beams emitted by the electron guns are corrected so that pictures having satisfactory convergence properties can be produced on the screen of the display tube. Combinations of display tube and deflection yoke of this type are referred to as self-convergent.

In the design of deflection units for monochrome data graphic display tubes the starting point has so far always been that long (dipole)deflection fields generate the fewest astigmatic effects. For example, European Patent Specification No. 53 853 is based on this recognition and it discloses the use of horizontal and vertical deflection fields of equal, though larger length than is conventional practice, the identical sixpole field components (first a positive component and then a negative component viewed in the direction from the display screen to the gun). However, also in deflection coils which are designed and manufactured very carefully on the basis of this recognition the effect occurs that the electron beam spot is perfect in the corners of the display screen, but is not quite perfect at the ends of the screen axes. Improvement of the spot quality on these axes by means of a different distribution of the sixpole field components results in a deterioration of the spot quality in the corners.

SUMMARY OF THE INVENTION

Upon energization the field of one of the deflection coils extends considerably close to the electron gun system than the field of the other deflection coil and in that, viewed in the direction from the display screen to the electron gun system, the field successively has a positive and a negative sixpole component, whereas the field of the other deflection coil, viewed in the direction from the display screen to the electron gun system, successively has a negative and a positive sixpole component.

Since the predeflections in the line and field deflection coils are not identical (because the field of one of them commences considerably earlier than the field of the other) it is possible to control the quality of the spot in the corners, on the horizontal axis and on the vertical axis independently of each other by correct adjustment of the sixpoles. The spot can thereby be perfected across the entire display screen.

The geometric (north-south and east-west) raster requirements are abandoned in this case. The invention is therefore particularly attractive for use in cases in which the rasters must be corrected electronically anyway, for example, if the display tube has a flat display screen.

In addition the invention may be used advantageously for obtaining a system with three perfect spots in high-resolution colour display tubes.

DETAILED DESCRIPTION OF THE INVENTION

Figure 1:
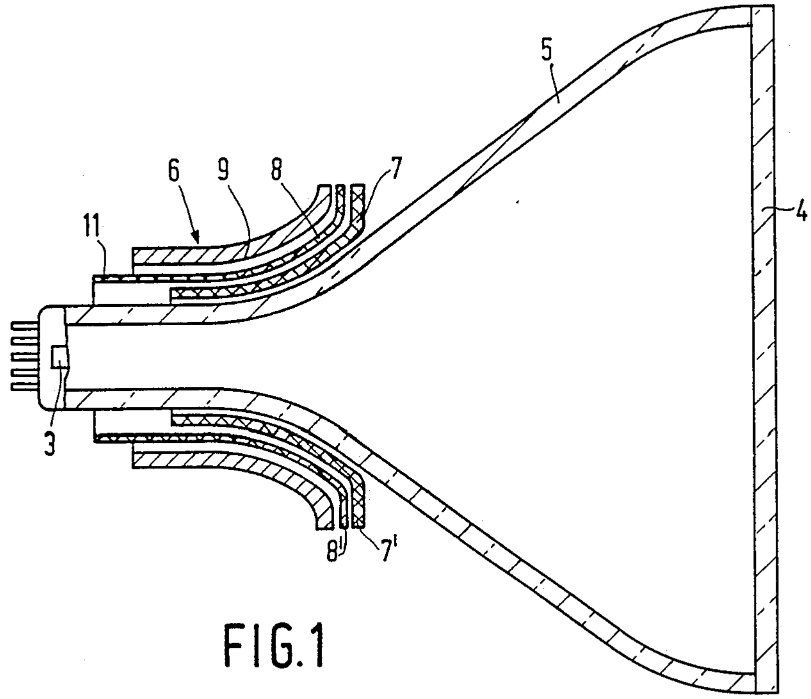
FIG. 1 is a diagrammatic elevational view of a longitudinal section through a first combination of a display tube and a deflection unit according to the invention.

FIG. 1 shows a television display device having a display tube 1 with a neck portion 2 accommodating an electron gun system 3 for producing at least one electron beam and with display screen 4 on which phosphor elements of one colour are provided. However, the invention is not limited to a television display device with a monochrome display tube. The display tube 1 may be alternatively a colour display tube with a suitable electron gun system 3 and a display screen 4 with repetitive groups of red, green and blue phosphor elements.

A deflection unit 6 is arranged around the envelope 5 of the display tube 1. This unit comprises a line deflection coil constituted by two line deflection coil units 7, 7' and a field deflection coil constituted by two field deflection coil units 8, 8'. An annular core 9 of a soft-magnetic material is arranged coaxially around the line deflection coil and the field deflection coil which are both shown as saddle type coils in the Figure. Saddle type coils are understood to mean coils which are constituted by two facing groups of conductors extending in the longitudinal direction and being connected together at their ends by arc-shaped groups of conductors arranged transversely to the longitudinal direction. The field deflection coil may be alternatively of the toroidal type instead of the saddle type and may be wound on the annular core 9.

Figure 2A:
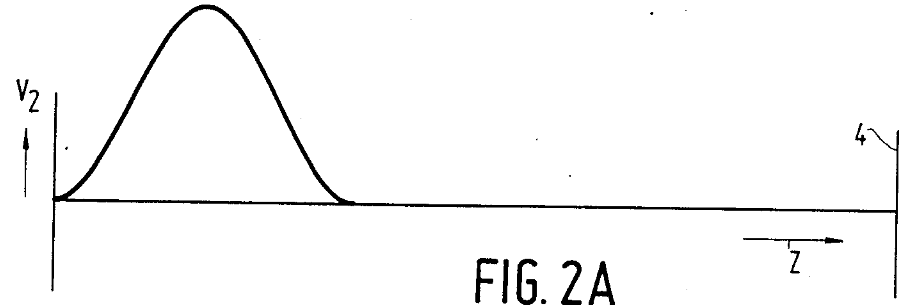
FIG. 2A shows the variation of the dipole field generated by the field deflection coil of the deflection unit of FIG. 1
Figure 2B:
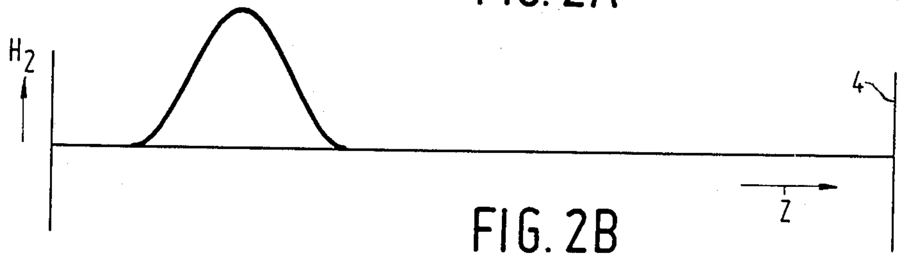
FIG. 2B shows the variation of the dipole field generated by the line deflection coil of the deflection unit of FIG. 1

The rear end of the field deflection coil units 8, 8' is located closer to the gun 3 than the rear end of the line deflection coil units 7, 7'. Thus, the field deflection coil extends closer to the gun than does the line deflection coil. This means that upon energization of the respective deflection coils the vertical dipole field continues further towards the gun 3 than does the horizontal dipole field. This situation is shown in FIGS. 2A and 2B. The amplitude $V_2$ of the vertical dipole field which is generated by the deflection unit 6 along the Z-axis is shown in FIG. 2A and the amplitude $H_2$ of the horizontal dipole field which is generated by the deflection unit 6 along the Z-axis is shown in FIG. 2B. With such a mutual location of the dipole fields it can be achieved that the corner spot, the horizontal axis spot and the vertical axis spot can be controlled independently of each other. A perfect spot can be realized by subsequently generating a specific sixpole field distribution in the line deflection coil and the field deflection coil. This sixpole field distribution will b explained with reference to FIGS. 3A and 3B.

Figure 3A:
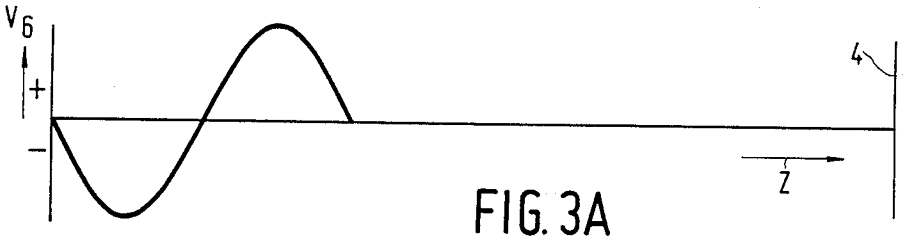
FIG. 3A shows the sixpole field added thereto.

FIG. 3A shows the variation of the sixpole field component $V_6$ which is added to the longest dipole field, in this case the dipole field of the field deflection coil. A screen-sided positive sixpole field component and a negative sixpole field component remote from the screen 4 can be recognized. There is a positive sixpole field if a pincushion-shaped field inhomogeneity occurs by adding a sixpole field to a dipole field and there is a negative sixpole field if a barrel-shaped field inhomogeneity occurs by adding a sixpole field to a dipole field.

Figure 3B:
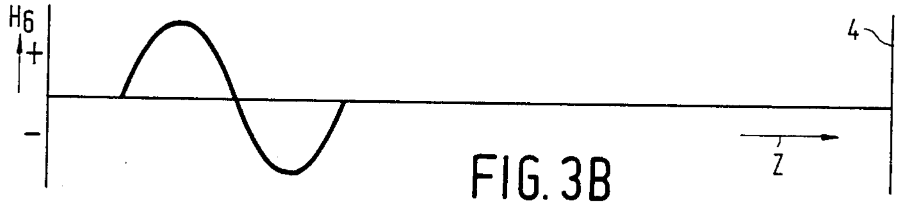
FIG. 3B shows the sixpole field added thereto.

FIG. 3B shows the variation of the sixpole field component $H_6$ which is added to the shortest dipole field, in this case the horizontal deflection field. Its variation is opposite to that of the sixpole field added to the longest dipole field.

Figure 4:
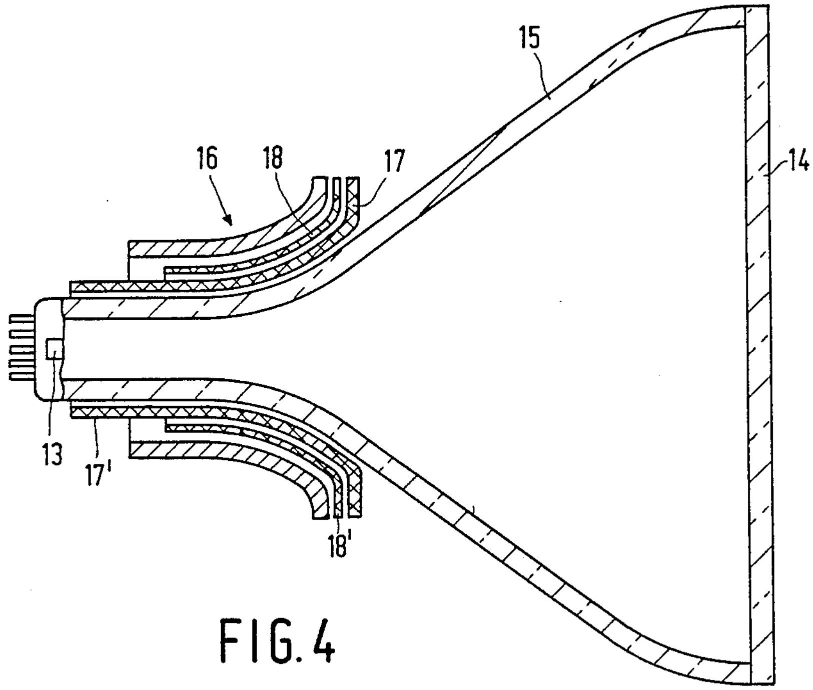
FIG. 4 is a diagrammatic elevational view of a longitudinal section through a second combination of a display tube and a deflection unit according to the invention.
Figure 5A:
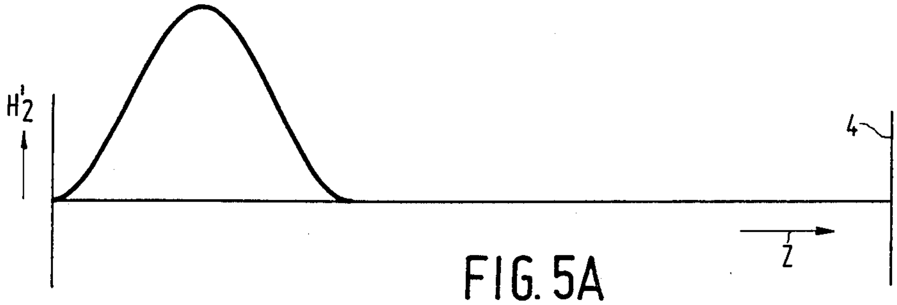
FIG. 5A shows the variation of the dipole field generated by the line deflection coil of the deflection unit of FIG. 4
Figure 5B:
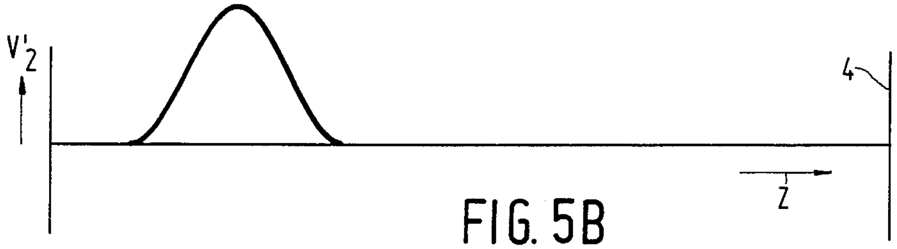
FIG. 5B shows the variation of the dipole field generated by the field deflection coil of the deflection unit of FIG. 4
Figure 6A:
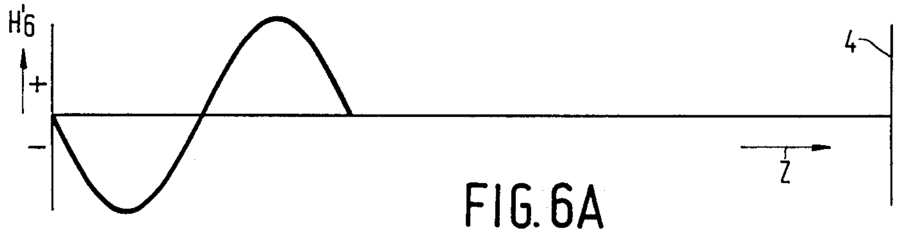
FIG. 6A shows the sixpole field added thereto.
Figure 6B:
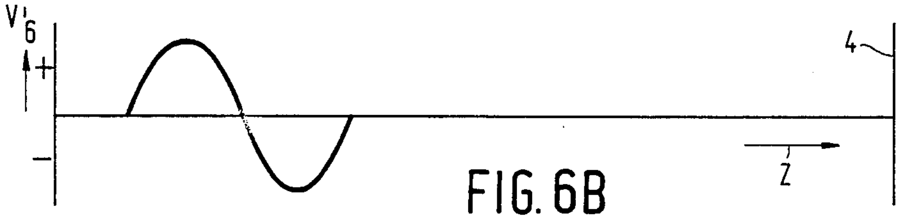
FIG. 6B shows the sixpole field added thereto.

FIG. 4 shows an alternative combination 16 of a display tube and a deflection unit according to the invention. It differs only from the combination of FIG. 1 in that it has a line deflection coil 17, 17' which extends closer to the gun 13 than does the field deflection coil 18, 18'. This means that upon energization of the deflection coils the horizontal dipole field continues further towards the gun 13 than does the vertical dipole field. This situation is shown in FIGS. 5A and 5B, with FIG. 5A showing the variation of the horizontal dipole field $H'_2$ and FIG. 5B showing the variation of the vertical dipole field $V'_2$. The variation of the intensity of the added sixpole field components $H'_6$ and $V'_6$ is shown in FIGS. 6A and 6B, respectively.

The characteristic features of the invention and their use will now be described in greater detail.

Reverting to FIGS. 2A, 2B, 3A and 3B it can be seen that the vertical dipole field $V_2$ begins (beginning is understood to mean: on the side remote from the display screen 4) before the horizontal dipole field $H_2$ begins. This means that the vertical sixpole component $V_6$ added thereto exerts a certain effect while there is some extent of predeflection in the vertical deflection direction (y) but no predeflection yet in the horizontal deflection direction (x). The effect in question is an effect on the field astigmatism. By adjusting the (gun-sided) negative lobe of the vertical sixpole $V_6$ (by choosing the winding distribution of the field deflection coil) spot errors at the ends of the vertical axis may be given a desired small value. The horizontal dipole field $H_2$ begins later than the vertical dipole field $V_2$. This means that the horizontal sixpole component $H_6$ added thereto exerts a certain effect while there is already a considerable extent of predeflection in the vertical deflection direction (y) but no or hardly any predeflection in the horizontal deflection direction (x). The effect which then occurs is an effect on the corner astigmatism. By adjusting the (gun-sided) positive lobe of the horizontal sixpole $H_6$, x-errors in the corners may be given a desired small value. Due to its location, the negative (screen-sided) lobe of the horizontal sixpole $H_6$ has a substantial effect on the spot at the ends of the horizontal axis and little effect on the spot in the corners. By adjusting the screen-sided (negative) lobe of the horizontal sixpole $H_6$ x-errors at the ends of the horizontal axis may therefore be given a desired small value. Due to its location, the screen-sided (positive) lobe of the vertical sixpole $V_6$ does have a substantial effect on the spot in the corners and little effect on the spot at the ends of the vertical axis. The y-errors in the corners can therefore be given a desired small value by adjusting the screen-sided (positive) lobe of the vertical sixpole $V_6$.

In summary it can be stated that the dipole fields are positioned with respect to each other in such a way that for the two lobes of their sixpole components (both in the field deflection coil and in the line deflection coil) the mutual ratio between the effect in the corners and at the ends of the axis is different. This fact is utilized during adjustment. For a colour display tube this principle may be used to produce three perfect spots and to give the $RB_y$ convergence error (the convergence error of the outer beams in the y-direction) a desired small value. This is possible because the field requirements for this convergence error coincide with those for a correct spot. The $RB_x$ convergence error may then be given a desired small value (even zero) by presenting the video information for the three different colours in a time shifted manner.

It is to be noted that for the sake of simplicity the dipole and sixpole fields which are diagrammatically shown in FIGS. 2A, 2B, 3A and 3B extend equally far in the direction of the display screen 4. However, the invention is not limited to such a field configuration. It is notably possible for the deflection field, which extends furthest in the direction of the gun (the vertical deflection field in this case), to extend less far in the direction of the display screen 4 than the other deflection field (the horizontal deflection field in this case).

The field configuration shown in FIGS. 5A, 5B, 6A and 6B can be explained analogously as above.

What is claimed is:

1. A display device including a display tube whose neck accommodates a gun system for emitting at least one electron beam to a facing display screen, and an electromagnetic deflection unit arranged around the envelope of the display tube, said unit comprising a first deflection coil and a second deflection coil arranged coaxially with respect to the first deflection coil, each coil having a front end facing the display screen and a rear end, the deflection fields generated by the two deflection coils upon energization being at right angles to each other and both extending in a part of the space between the gun system and the display screen, characterized in that upon energization the field of said first deflection coil extends considerably closer to the electron gun system than the field of the second deflection coil and in that viewed in the direction from the display screen to the gun system, the field of the first deflection coil successively has a positive and a negative sixpole component, whereas the field of the second deflection coil, viewed in the direction from the display screen to the gun system, successively has a negative and a positive sixpole component.

2. A display device as in claim 1 wherein said first deflection coil is a field deflection coil, whereby the vertical deflection field extends closer to said gun system.

3. A display device as in claim 1 wherein said first deflection coil is a line deflection coil, whereby the horizontal deflection field extends closer to said gun system.

* * * * *